United States Patent Office 3,072,620
Patented Jan. 8, 1963

3,072,620
N-VINYL-3-MORPHOLINONE-ACRYLAMIDE
COPOLYMERS
Ralph E. Friedrich, Midland, Mich., assignor to The Dow Chemical Company, Midland, Mich., a corporation of Delaware
No Drawing. Filed May 5, 1960, Ser. No. 26,972
3 Claims. (Cl. 260—80.3)

This invention is concerned with novel copolymer compositions and is particularly directed to copolymers of N-vinyl-3-morpholinone and acrylamide.

The novel compositions of the invention are water-soluble, high-molecular-weight copolymers prepared by polymerization through the ethylenic double bond of from about 1 to 50 percent by weight of N-vinyl-3-morpholinone with correspondingly from about 99 to 50 percent by weight of acrylamide. The novel copolymers are amorphous solids and may be prepared as aqueous solutions, aqueous gels or as a dry powder or flake material. Said copolymers are substantially insoluble in organic solvents such as hydrocarbons, ketones, alcohols, halohydrocarbons, and carbon disulfide. Preferred compositions are those copolymers containing in combined form from about 3 to 20 percent by weight of vinyl-morpholinone with correspondingly from about 97 to 80 percent by weight of acrylamide.

The new copolymers are conveniently prepared by subjecting a solution of a suitable mixture of N-vinyl-3-morpholinone and acrylamide to conditions conducive to vinyl polymerization, that is, to conditions fostering copolymerization through the ethylenic unsaturated group. Thus copolymerization may be induced by the action of free radicals generated from peroxide and azo type polymerization catalysts or by the action of high energy radiation such as gamma radiation and X-rays and the like. The copolymerization reaction is exothermic and proceeds readily once initiated by the introduction of the free radicals. Suitable catalysts include tertiaryalkyl hydroperoxides and peroxides, such as tertiarybutyl hydroperoxide and tertiarybutyl peroxide, aralkyl hydroperoxides, such as cumene hydroperoxide, alkali metal persulfates, aliphatic azo compounds, such as azobisisobutronitrile, and the like.

In a preferred mode of operation, from about 1 to about 50 parts by weight of N-vinyl-3-morpholinone and correspondingly from about 99 to about 50 parts by weight of acrylamide are dissolved in water to prepare a solution containing from about 10 to about 25 percent by weight of total monomers. The pH of the solution is adjusted to the range of pH 6 to 7 and sufficient of the disodium salt of ethylenediaminetetracetic acid is added to sequester any metallic ions which might interfere with the polymerization. The solution is then heated to about 40° C. and from about 200 to 500 parts of tertiarybutyl hydroperoxide and from 200 to 500 parts of potassium persulfate per million parts of monomers present are added with stirring. The copolymerization reaction is readily initiated when the catalysts are added to the reaction mixture and proceeds with the evolution of heat. On completion of the reaction the crude copolymer product is obtained as a tough, highly viscous, aqueous gel. The latter may be dried, for example, on double drum dryers to produce a white flaky copolymer product.

The copolymerization reaction proceeds readily at temperatures of from about 40° C. to 100° C. or more, however, in order to obtain desirably high molecular weights and to avoid run-away conditions with attendant danger of explosion, it is generally preferred to initiate copolymerization at as low a temperature as possible and to employ cooling if necessary to prevent peak temperatures, generated by the exothermic nature of the reaction, from rising above about 90° C. The reaction is preferably carried out in the absence of free oxygen, conveniently under a blanket of nitrogen, and under atmospheric pressure or at somewhat elevated pressures in sealed vessels.

Redox agents such as sulfites or polymerization modifiers such as mercaptans may be incorporated in the reaction mixture in conventional fashion for controlling the degree and rate of polymerization if desired. Other auxiliary agents such as buffering agents and roll-release agents may also be included.

It will be apparent that small amounts of other monoethylenically unsaturated monomers may be copolymerized with the mixture of vinylmorpholinone and acrylamide without fundamentally altering the properties of the copolymers resulting. Thus up to about 10 percent of the acrylamide can be replaced with acrylic acid, methacrylic acid or methacrylamide or up to about 5 percent thereof with acrylonitrile or the like.

The copolymers of the invention are useful as flocculating agents for improving the rate of sedimentation and filtration of finely divided solids from aqueous suspension and are of particular utility in providing clarified supernatant liquid layers in the sedimentation of certain uranium ore solids from the Colorado Plateau of the United States and Blind River region of Canada. The new copolymers may be employed either alone or in conjunction with other water-soluble polymers, such as polyacrylamide, for settling mineral solids, for improving the filterability of sewage sludge and for increasing filler retention in the manufacture of paper. In such operations, appreciable improvement in settling rate of highly amenable solids is obtained with as little as 0.001 pound of copolymer per ton of suspended solids. For most mineral solids, good results as regards settling rates are obtained when employing from about 0.01 to about 0.2 pound of copolymer per ton of finely divided, suspended solids while amounts ranging up to 2 or more pounds per ton may be required in filtration operations, particularly for the filtration of sewage sludge.

In addition to the composition of the copolymers as set forth above, an important criterion for usefulness of the copolymers is that they be of high molecular weight. A convenient index of molecular weight of such copolymers is provided by the viscosity of aqueous solutions thereof under standard conditions. The expression "0.5 percent viscosity" as hereinafter employed means the viscosity in centipoises of a 0.5 percent by weight solution of the copolymer in distilled water at 25° C. and adjusted to a pH of 3 to 3.5, as determined with an Ostwald viscosimeter. Copolymers for use in accordance with the invention should have 0.5 percent viscosities of at least 1.2 centipoises and preferably of 1.5 centipoises or more.

The following examples illustrate the invention but are not to be construed as limiting the same. In the following, parts and percentages are by weight unless otherwise designated.

*Example 1*

2 parts of N-vinyl-3-morpholinone and 198 parts of acrylamide were dissolved in 800 parts of water. To the resulting solution, there were added 0.2 part of the disodium salt of ethylenediaminetetracetic acid and 0.5 part of tertiarybutyl hydroperoxide catalyst. The solution was then deaerated by bubbling nitrogen gas therethrough for 10 minutes. The deaerated solution was sealed in a glass vessel and the latter heated in a thermostatically controlled bath at 70° C. for 16 hours. During this period, copolymerization proceeded with the conversion of the solution to a thick gel. Thereafter the reaction vessel and contents were cooled and the vessel was opened.

The copolymer product was found to be water-soluble and characterized by a viscosity of 14.8 centipoises for a 0.5 percent solution thereof in water at a pH of 3 and a temperature of 25° C. as determined with an Ostwald viscosimeter.

*Example 2*

The procedure of Example 1 was repeated using the same quantities of total monomers and of other agents with the proportions of the vinyl-morpholinone and acrylamide being varied. Water-soluble copolymers were obtained in each case. The amounts of the monomers employed and 0.5 percent viscosities (determined as in Example 1) of the products are set forth in the following table:

| Parts of N-vinyl-3-Morpholinone | Parts of Acrylamide | 0.5 Percent Viscosity of Copolymer, Centipoises |
|---|---|---|
| 10 | 190 | 3.6 |
| 20 | 180 | 2.3 |
| 40 | 160 | 1.6 |
| 100 | 100 | 1.2 |

*Example 3*

Varying amounts of a dilute solution of the copolymer of Example 1 were added to equal portions of a slurry of finely divided mineral solids. The slurry contained 10 grams of solids per 100 milliliters, the solids consisting essentially of about 30 percent finely divided illite clay and about 70 percent of minus 200 mesh silica. The dosage of copolymer solution was adjusted to provide loadings of 0.01, 0.025 and 0.05 pound of copolymer per ton of solids in the slurry. In each case, the copolymer solution was added in 3 approximately equal increments to the slurry contained in a cylindrical settling vessel and the latter was stoppered, inverted and returned to the upright position 3 times after each incremental addition to accomplish gentle, thorough mixing. After the final mixing the cylinders were returned to the upright position and timing of sedimentation was commenced. The time for the solids to settle from 90 percent to 60 percent of the original volume was employed to calculate the settling rates. The settling rates obtained are summarized in the following table:

| Pounds of Copolymer Per Ton of Solids | Settling Rate, Inches per Minute |
|---|---|
| 0.01 | 2.6 |
| 0.025 | 6.9 |
| 0.05 | 11.2 |

In the time required for the above determinations no detectable settling of an untreated portion of the slurry occurred.

In a further determination, an aqueous solution of a copolymer of 10 percent N-vinyl-3-morpholinone with 90 percent acrylamide (characterized by a 0.5 percent viscosity of 2.2 centipoises) was added to a slurry containing 15 grams per 100 milliliters of difficultly settleable, finely divided solids resulting from acid-leaching of a Colorado sandstone for the extraction of uranium values. Sufficient of the copolymer solution was added to provide 0.132 pound of copolymer per ton of suspended solids. The treated slurry had a good settling rate and produced an exceptionally clear supernatant liquid layer on settling.

N-vinyl-3-morpholinone has the formula:

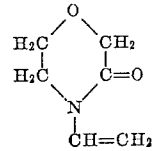

I claim:

1. A water-soluble copolymer comprising in combined form from about 1 to 50 percent by weight of N-vinyl-3-morpholinone and correspondingly from about 99 to 50 percent by weight of acrylamide.

2. A copolymer according to claim 1 characterized by being water-soluble and having a viscosity of at least 1.2 centipoises for a 0.5 percent by weight solution thereof in water at a pH of 3 to 3.5 and a temperature of 25° C. as determined with an Ostwald viscosimeter.

3. A water-soluble copolymer comprising in combined form from about 3 to about 20 percent by weight of N-vinyl-3-morpholinone and correspondingly from about 97 to about 80 percent by weight of acrylamide.

References Cited in the file of this patent

UNITED STATES PATENTS 2,952,668    Ehlers _____ Sept. 13, 1960